United States Patent
Massa et al.

[11] Patent Number: 5,916,740
[45] Date of Patent: Jun. 29, 1999

[54] PHOTOGRAPHIC FILM BASE AND PHOTOGRAPHIC ELEMENTS

[75] Inventors: Dennis J. Massa; James M. O'Reilly, both of Pittsford, N.Y.

[73] Assignee: Eastman Kodak Company, Rochester, N.Y.

[21] Appl. No.: 08/936,564

[22] Filed: Sep. 24, 1997

[51] Int. Cl.$^6$ .................................................. G03C 1/795
[52] U.S. Cl. ........................ 430/536; 430/627; 430/523
[58] Field of Search .................................... 430/536, 627, 430/523

[56] References Cited

U.S. PATENT DOCUMENTS

| | | | |
|---|---|---|---|
| 3,306,874 | 2/1967 | Hay . | |
| 3,383,435 | 5/1968 | Cizek . | |
| 4,141,735 | 2/1979 | Schrader et al. | 430/141 |
| 4,946,897 | 8/1990 | Albizzati et al. | 525/132 |
| 5,109,068 | 4/1992 | Yamasaki et al. | 525/151 |
| 5,166,238 | 11/1992 | Nakano et al. | 524/120 |
| 5,188,930 | 2/1993 | Funaki et al. | 430/536 |
| 5,294,473 | 3/1994 | Kawamoto | 428/141 |
| 5,368,997 | 11/1994 | Kawamoto | 430/533 |
| 5,476,899 | 12/1995 | Funaki et al. | 524/577 |
| 5,582,964 | 12/1996 | Hashimoto et al. | 430/536 |
| 5,705,325 | 1/1998 | Hosoi | 430/502 |
| 5,705,328 | 1/1998 | Shiozaki | 430/531 |
| 5,705,329 | 1/1998 | Nakajima et al. | 430/536 |
| 5,773,125 | 6/1998 | Hashimoto et al. | 428/141 |

OTHER PUBLICATIONS

Research Disclosure 37038, Feb., 1995, pp. 79–116.
Research Disclosure 38957, Sep., 1996, pp. 591–639.
Research Disclosure 36544, Sep. 1994, pp. 501–541.

*Primary Examiner*—Mark F. Huff
*Attorney, Agent, or Firm*—Carl F. Ruoff

[57] ABSTRACT

A highly useful photographic film base comprises a miscible blend of is syndiotactic polystyrene, SPS, and a polyxylylidene ether, PXE, in specified proportions. Photographic elements prepared with this film base have a lesser tendency to take core-set and post process curl than do elements prepared with syndiotactic polystyrene, SPS, film base.

12 Claims, No Drawings

PHOTOGRAPHIC FILM BASE AND PHOTOGRAPHIC ELEMENTS

FIELD OF THE INVENTION

This invention relates to a novel photographic film base prepared from a novel blend of polymers and to photographic elements containing this film base.

BACKGROUND OF THE INVENTION

Silver halide color photographic elements comprise one or more light sensitive layers coated on a support. Typically the support is a sheet of a transparent or translucent film, commonly referred to as a film base. Common film base materials for photographic elements are cellulose triacetate and poly(ethylene terephthalate). These materials have properties which render them suitable for photographic applications. More recently it has been proposed to use poly (ethylene napthalate) as a film base for photographic elements which are intended to be used in a cartridge of reduced diameter which requires rolling the film more tightly than previously. While conventional 35 mm film spools have diameters of about 11 mm, spools for proposed film cartridges have diameters as low as 7 mm, or lower. This is discussed in U.S. Pat. Nos. 5,294,473 and 5,368,997, which suggest that poly(ethylene naphthalate) has higher stiffness and lower propensity to take up core-set than either cellulose triacetate or poly(ethylene terephthalate).

In order to realize the curl and core-set advantages of films made from poly(ethylene naphthalate), it is necessary to anneal the film at elevated temperatures for substantial periods of time. Even then, the core-set and curl characteristics are not as good as would be desired.

Accordingly, it would be desirable to provide a film base with improved physical properties. In particular it would be desirable to have a film base that has a lower propensity to curl and take up core-set while retaining adequate stiffness and tear strength. It also would be desirable to have such a film base which can be annealed using milder conditions.

SUMMARY OF THE INVENTION

We have found that a novel blend of syndiotactic polystyrene (SPS) and polyxylylidene ether, PXE, provides a film base with a number of useful properties which makes it particularly advantageous for photographic films.

In one aspect, the present invention is a photographic film base comprising a miscible blend of from 50–95 weight percent syndiotactic polystyrene (SPS) and from 50–5 weight percent of polyxylylidene ether, PXE In another aspect the present invention is a silver halide photographic element comprising a film base bearing at least one photographic layer, the film base comprising a miscible blend of from 50–95 weight percent syndiotactic polystyrene (SPS) and from 50–5 weight percent of polyxylylidene, ether PXE.

The present invention provides a film base that has desirable properties for use in photographic elements. These include low core-set, low post-process curl, good stiffness and moderate tear strength. In addition, these properties can be obtained without the need for annealing or by annealing for shorter times. Film base of this invention has core-set properties which permits its use in small diameter cartridges, for example, diameters in the range of 3 to 12.5 mm.

DETAILED DESCRIPTION OF THE INVENTION

Syndiotactic polystyrene sometimes abbreviated as SPS, previously has been used as a support for magnetic recording and playback tapes and had been proposed for use as a support for photographic film, for example in U.S. Pat. Nos. 5,188,930, 5,476,899 and 5,166,238 incorporated by reference herein. These patents broadly describe copolymers of SPS and blends of SPS with other copolymers, but not with polyxylylidene oxide, PXE.

The SPS used in the polymer blend of this invention can be the same polymer as described in this prior art, such as U.S. Pat. Nos 4,946,897 and 5,109,068 incorporated by reference herein. These patents and publication do not describe the blends of this invention or suggest that they would be suitable for use as a photographic film base. Nor does any of this art suggest that blending SPS with PXE would have any influence on the core-set and post-process curl characteristics of a film based prepared from the blend, let alone suggest that such a blend would provide a film base in which these characteristics were improved.

The blends of this invention preferably have the following physical characteristics: a Tg of greater than 95° C.; a tensile modulus greater than 350 Kg/mm$^2$; light transmission greater than 80%; and haze less than 3%. The way in which these characteristics are determined is described in the Examples, infra While the relative proportions of SPS and PXE may vary somewhat with variations in the particular PXE employed, as well as with the presence of other components in the blend, preferred proportions of SPS and PXE in the blends of this invention are from 50 to 95 weight percent SPS and from 5 to 50 weight percent of PXE, preferably from 50 to 90 weight percent SPS and from 10 to 50 weight percent of PXE. For the properties of tear strength and core set the most preferred proportions are from 50 to 65 weight percent of SPS and from 50 to 35 weight percent of PXE. For the property of manufacturability, the most preferred proportions are from 75 to 90 weight percent of SPS and from 25 to 10 weight percent of PXE. When the proportion of PXE is increased, we have found that the tensile modulus is decreased, the crystallinity of the blend is lowered and a sheet formed from the blend is more difficult to stretch. Preferably it is SPS or SPS copolymer with para methyl styrene.

The SPS used in the polymer blends of this invention preferably have molecular weights of 10,000 to 300,000. The SPS used in the polymer blends of this invention preferably has a glass transition temperature (Tg), above about 95–100° C. The stereoregularity of SPS as measured by $C^{13}$ NMR spectra should be between 25 and 75% racemic dyads. Copolymers of syndiotactic polystyrene with alkyl styrene, halogenated styrene, halogenated alkyl styrene, alkoxy styrene are also effective as a film base. Polystyrene and p-methyl styrene are the preferred embodiments Polyxylylidene ether, PXE, is prepared by oxidative coupling described under U.S. Pat. No 3,306,874 incorporated by reference herein. Blends of PXE and conventional polystyrene are described under U.S. Pat. No. 3,383,435 incorporated by reference herein. Preferably, the PXE has a molecular weight of 10,000 to 100,000 as measured by and an intrinsic viscosity of 0.3–1.0 dL/g in methylene chloride.

The PXE used in this invention preferably has a glass transition temperature (Tg) of about 220° C. In addition, the PXE should be miscible with the SPS. By miscible is meant that the blend of the two polymers has a single glass transition temperature (Tg) and that a photographic film base made from the blend is clear. The PXE is available commercially from the General Electric Company, One Plastics Ave., Pittsfield, Mass. 01201, under the Blendex® trade name.

Blending of PXE with polymers, such as SPS is broadly described in U.S. Pat. No. 5,109,068. A sheet formed from the blend becomes difficult to stretch, thus making the sheet more difficult to manufacture. When the proportion of PXE is decreased below about 5 percent the improvement in physical performance of the blend becomes insignificant. Preferably the proportion of PXE is between 10 and 50 percent by weight. Most preferably the proportion of PXE is between 10 and 25 percent by weight..

The polymer blend can be prepared by combining SPS and PXE using compounding techniques known to those skilled in the art. Film base is prepared from the polymer blend by techniques known to those skilled in the art. These techniques are described in detail in Schrader U.S. Pat. No. 4,141,735, the disclosure of which is incorporated herein by reference. A film base is understood to be a planar sheet having a thickness in the range of 50 to 200 μm, preferably a thickness of 70 to 110 μm.

In a typical operation, the film base is formed by extruding the polymer blend at a temperature of 290 to 320° C. through a sheeting die and casting the molten sheet on a chill roll at a temperature of 60 to 120° C. The cast sheet is then stretched biaxially to from 2 to 5 times its initial lateral dimensions. Stretching can be at a temperature in the range of from 100 to 180° C. Following biaxial stretching the film base is heatset at a temperature of from 200 to 250° C. for a time of from 0.1 to 10 sec. If the film base is to be annealed, it can be annealed at a temperature in the range of from 50° C. up to the Tg of the polymer blend for a time in the range of 0.1 to 1000 hours. Film base with core-set characteristics useful for small diameter film cartridges can be obtained with preferred blends of this invention by annealing at temperatures of between about 80 and 135° C. for times of 2 to 168 hours.

Film base prepared from polymer blends of this invention can contain other components commonly found in film supports for photographic elements. These include dyes, lubricants and particles of organic and inorganic materials such as glass beads. These are described in more detail in *Research Disclosure*, February 1995, Item 37038, pages 79–114, *Research Disclosure*, September 1996, Item 38957 pages 591–639 incorporated by reference herein.

Film base prepared from polymer blends of this invention can bear layers commonly found on film supports used for photographic elements. These include magnetic recording layers, subbing layers between other layers and the support, photosensitive layers, interlayers and overcoat layers, as are commonly found in photographic elements. These layers can be applied by techniques known in the art and described in the references cited in *Research Disclosure* Items 37038 and 38957 cited above.

Magnetic recording layers that can be used in photographic elements of this invention are described in U.S. Pat. Nos. 3,782,947; 4,279,945; 5,147,768; 5,252,441; 5,254,449; 5,395,743; 5,397,826; 5,413,902; 5,427,900; 5,432,050, 5,434,037, 5,436,120, in *Research Disclosure* November 1992, Item 34390, pages 869 et seq., and in Hatsumei Kyouk,ai Gihou No. 94-6023, published Mar. 15, 1994 by Hatsumei Kyoukai, Japan incorporated by reference herein.

Photographic elements of this invention can have the structures and components shown on *Research Disclosure* Items 37038 and 38957 cited above and can be imagewise exposed and processed using known techniques and compositions, including those described in the *Research Disclosure* Items 37038 and 38957 cited above.

The following examples further illustrate this invention.

EXAMPLE 1

Sheets formed from SPS and blends of SPS and PXE in the proportions shown in Table 1, below, were prepared and evaluated, as follows:

Pure syndiotactic polystyrene, identified as Composition 1, having an inherent viscosity of 0.69 dL/g, was blended in a twin screw extruder with 20 weight percent of PXE sold by General Electric Company, One Plastics Ave., Pittsfield, Mass. 01201 to form a blend identified SPS/PXE 80/20.

The compositions were extruded through a sheeting die and cast on a chill roll to a thickness of 1.1 mm. The cast sheets were stretched biaxially at a ratio of 3.5×3.5 and then heat set to provide film base useful in this invention.

The resulting films were evaluated for core-set and tensile properties and optical properties, as described below. The results are reported in Table 1.

Glass Transition Temperature

Samples of each composition were heated in a differential scanning calorimeter (DSC& sold by Perkin-Elmer of Norwalk, Conn.) from about 20° C. to 300° C. at 10° C./min, then quenched back to 20° C. and finally reheated to 300° C. at 10° C./min. The Tg reported is the mid-point temperature in the first transition of the first thermogram.

Tensile Properties

Five lengthwise and five widthwide strips 150 mm×15 mm were cut from each of the films prepared above. A Sintech tensile tester (available from Sintech Inc. 378 Page St., Stoughton, Mass. 02072) was used to measure representative tensile properties in accordance with ASTM D882. The properties measured (and the units in which they are reported in Table 2) are: tensile modulus ($Kg/mm^2$), yield stress ($Kg/mm^2$), break stress ($Kg/mm^2$) and break elongation (%).

Tear Strength

Five lengthwise and five widthwide strips 75 mm×25 mm were cut from each of the film bases prepared above and tested in accordance with ASTM D1938. Tear strength is reported as the force (g) needed to propagate the tear.

Optical Properties

Both haze and light transmission were measured using a BYK-Gardener XL-211 hazemeter (available from BYK-Gardener Inc., 2435 Linden La., Silver Springs, Md. 20910) according to the procedure at ASTM D1003-61.

Core-Set (CS)

For each of the tests shown below, six lengthwise strips 150 mm×35 mm were cut from each of the films prepared above. The strips were conditioned at 21° C./50% relative humidity overnight and their curl was measured according to Test Method A in ANSI P41.29-1985. The results are reported in terms of 1R, $m^{-1}$, where R is the radius of curvature of the curled film.

The following winding conditions were used in the core-set tests:

CSI: the film base was held at 80° C./50%RH for 2 hrs on a 7 mm diameter core (1/m).

TABLE 1

|  | SPS7 | SPS/PXE 80/20 | SPS/PXE 70/30 | SPS7/PXE 80/20 | SPS/PXE 60/40 | SPS/PXE 50/50 |
|---|---|---|---|---|---|---|
| Modulus kg/mm$^2$ | 370 | 390 | 380 | 390 | 450 | 341 |
| Yield Stress kg/mm$^2$ | 700 | 850 | 850 | 800 | 730 | 610 |
| BreakStress kg/mm$^2$ | 770 | 1000 | 1000 | 950 | 703 | 626 |
| Break Elong. % | 39 | 40 | 28 | 34 | 20 | 10 |
| Tear g | 22 | 6 | 8 | 7 | 84 | 115 |
| Haze % | 3.2 | 3.9 | 5.5 | 0.9 | 1.2 | 1.1 |
| Trans. % | 86.1 | 84.7 | 83.3 | 88.6 | 78 | 87.6 |
| Tg ° C. | 97 | 102 | 130 | 102 | 140 | 150 |
| Coreset 1/m |  |  |  |  |  |  |
| unannealed | >197 | 188 | 182 | >197 | 167 | 160 |
| annealed | 173 | 119 | 139 | 152 | 97 | 98 |

From the results reported in Table 1, it can be seen that improvements in core-set is obtained while retaining high tensile modulus, good tear strength and good optical properties.

The invention has been described in detail with particular reference to certain preferred embodiments thereof, but it will be understood that variations and modifications can be effected within the spirit and scope of the invention.

What is claimed is:

1. A photographic film base comprising a miscible blend of from 50 to 95 weight percent syndiotactic polystyrene, and from 50 to 5 weight percent of a polyxylylidene ether.

2. A photographic film base of claim 1, comprising a miscible blend of from 50 to 90 weight percent syndiotactic polystyrene, and from 50 to 10 weight percent of a polyxylylidene ether.

3. A photographic film base of claim 1, comprising a miscible blend of from 50 to 65 weight percent syndiotactic polystyrene and from 50 to 35 weight percent of a polyxylylidene ether.

4. A photographic film base of claim 1, comprising a miscible blend of from 75 to 90 weight percent syndiotactic polystyrene and from 25 to 10 weight percent of a polyxylylidene ether.

5. A photographic film base of claim 1, wherein the polymer blend has a Tg of greater than 125° C. and a tensile modulus of greater than 350 Kg/mm$^2$.

6. A photographic film base of claim 1 that has been annealed at a temperature in the range of from 50° C. up to the Tg of the polymer blend for a time in the range of 0.1 to 1000 hours.

7. A silver halide photographic element comprising a film base bearing at least one photographic layer, the film base comprising a miscible blend of from 50 to 95 weight percent syndiotactic polystyrene, and from 50 to 5 weight percent of a polyxylylidene ether.

8. A photographic element of claim 7, wherein the film base comprises a miscible blend of from 50 to 90 weight percent syndiotactic polystyrene, and from 50 to 10 weight percent of a polyxylylidene ether.

9. A photographic element of claim 7 wherein the film base comprises a blend of from 50 to 65 weight percent syndiotactic polystyrene and from 50 to 35 weight percent of a polyxylylidene ether.

10. A photographic element of claim 7 wherein the film base comprises a blend of from 75 to 90 weight percent syndiotactic polystyrene and from 25 to 10 weight percent of a polyxylylidene ether.

11. A photographic element of claim 7, wherein the film base bears a magnetic recording layer.

12. A photographic element of claim 7, wherein the film base has light transmission of greater than 80% and haze of less than 3%.

* * * * *